May 21, 1935.  C. EYMANN  2,002,365
PROCESS FOR REMOVING HYDROGEN SULPHIDE FROM GASES
CONTAINING AMMONIA AND HYDROGEN SULPHIDE
Filed Feb. 23, 1932
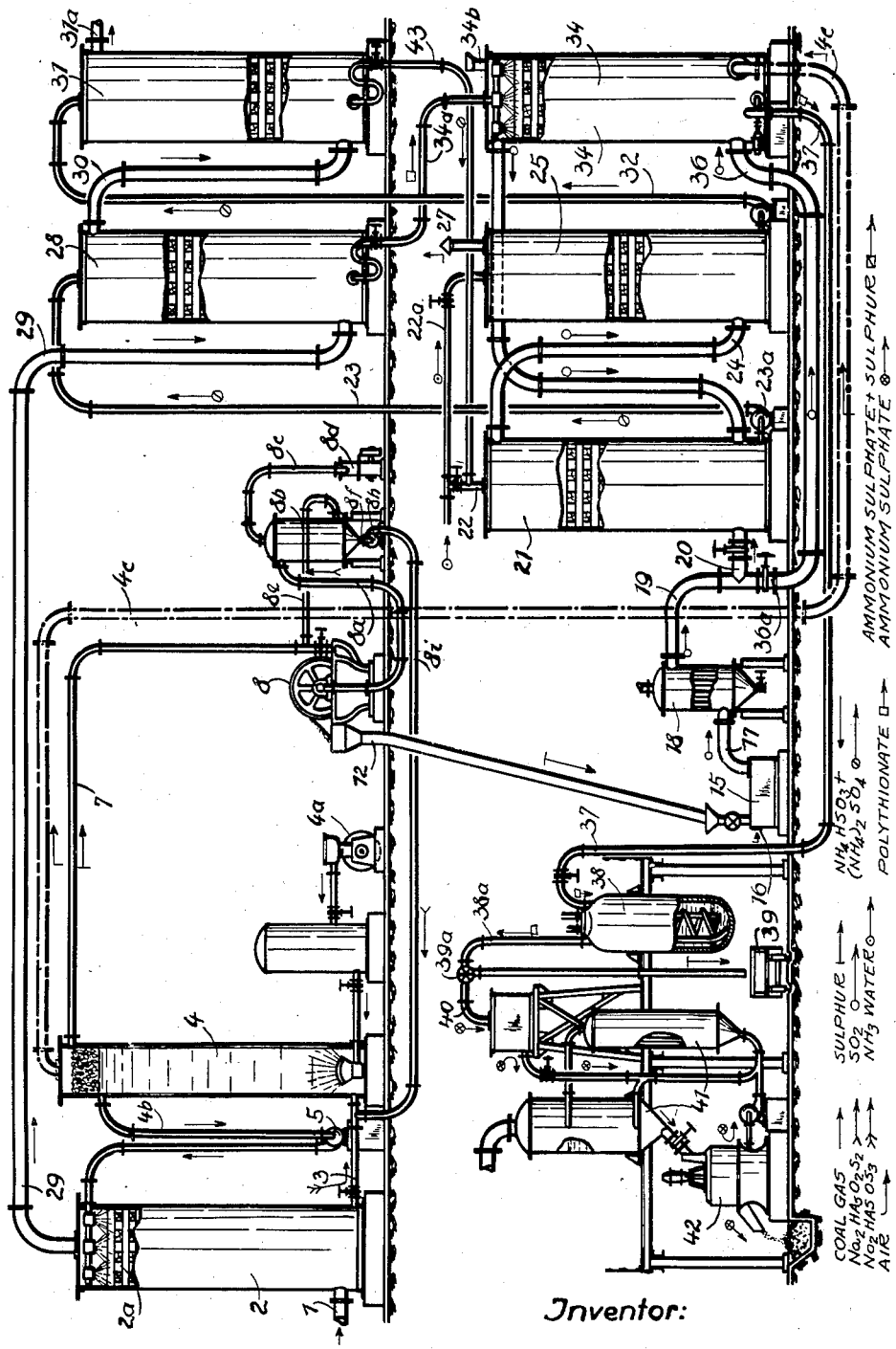
Inventor:

Patented May 21, 1935

2,002,365

UNITED STATES PATENT OFFICE 2,002,365

PROCESS FOR REMOVING HYDROGEN SULPHIDE FROM GASES CONTAINING AMMONIA AND HYDROGEN SULPHIDE

Constanz Eymann, Essen-Ruhr, Germany, assignor, by mesne assignments, to The Koppers Company of Delaware, Pittsburgh, Pa., a corporation of Delaware Application February 23, 1932, Serial No. 594,430
In Germany February 23, 1931

12 Claims. (Cl. 23—225)

This invention relates to the removal of hydrogen sulphide and similar compounds from gases such for instance as coal distillation gases, and more particularly to the removal of sulphur compounds from gases containing ammonia and hydrogen sulphide with recovery of ammonium sulphate and sulphur.

A method has been known for some time for removing hydrogen sulphide and similar compounds from gases, preferably coal distillation gases, in which the gas which is to be purified is washed with aqueous solutions of alkali arsenic compounds. The important constituent of such washing solutions is probably an acid sodium or alkali dithioarsenate which reacts with hydrogen sulphide according to the equation:

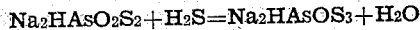

From the product of this reaction the effective initial compound may be regained by treating with gaseous oxygen or gases containing same (air), elementary sulphur being split off according to the equation:

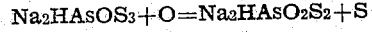

As all the other substances contained in the washing solution are soluble, the sulphur formed may easily be obtained from the solution in pure form by filtration, precipitation, centrifuging or the like.

Owing to the fact that practically pure sulphur is obtained from coal distillation gases the thioarsenate process has lately become more and more important. It has however the disadvantage which is important for certain purposes that it does not allow the sulphur content of the gas to be worked together with the ammonia so as to form ammonium sulphate which is very valuable as a fertilizer. On the contrary in order to obtain this product it has hitherto been necessary to provide a sulphuric acid plant in which the sulphur formed in the thioarsenate process is first burnt to sulphur dioxide which is then oxidized in the usual manner to form sulphuric acid, which is finally made to combine in an ordinary saturator with the ammonia separated wholly or partially from the gas so as to form solid ammonium sulphate.

In order to avoid the necessity of installing and operating a special sulphuric acid plant or factory for obtaining ammonium sulphate from the sulphur formed by the thioarsenate process it has been proposed to burn the sulphur to sulphur dioxide and combine the latter with the ammonia separated from the gas so as to form ammonium sulphite. This latter is then converted into thiosulphate by bringing into contact with further quantities of sulphur. When the thiosulphate is converted by treatment with sulphur dioxide wholly or partially into polythionate, which can then be converted in known manner into ammonium sulphate and sulphur by heating, preferably under pressure. This process certainly avoids the relatively complex method of forming sulphuric acid, but it has the defect that the ammonia has to be completely removed from the gas. Furthermore the conversion of ammonium sulphite into thiosulphate by adding sulphur which is necessary in this process represents a reaction which is not easy to carry out technically, owing to the fact that it requires relatively complicated apparatus and very careful supervision.

One object of my present invention is to provide an improved process for removing hydrogen sulphide from gases with recovery of ammonium sulphate and sulphur from the sulphur compounds and the ammonia of the gas, wherein the ammonium sulphate is produced in a very simple manner with a simultaneous improvement as regards the complete removal of hydrogen sulphide from the gas.

The process according to my invention consists essentially in the fact that a part of the hydrogen sulphide content of the gas which is to be purified is caused to combine by means of an aqueous solution of alkali-arsenic compounds, from which elementary sulphur is liberated by treatment with oxygen or gases containing same (air). Then after converting this sulphur into sulphur dioxide I combine the same with ammonia which may be previously separated from the gas under treatment, to form ammonium bisulphite, by means of which the residue of hydrogen sulphide is washed from the gas, forming thiosulphate and in given cases polythionate. The used washing liquid which now consists practically only of thiosulphate and polythionate, is converted into ammonium sulphate and sulphur by heating preferably under pressure, in certain cases after being previously treated with sulphur dioxide in order to produce a larger quantity of polythionate.

This washing of hydrogen sulphide from gases by means of ammonium bisulphite solutions; which in given cases also contain ammonium sulphite in such quantities that the solution has neither an ammonia nor a sulphur dioxide tension should, according to existing knowledge, proceed in the main according to the equation:

$$2NH_4HSO_3 + 2H_2S = (NH_4)_2S_2O_3 + 2S + 3H_2O$$

Thus from ammonium bisulphite and hydrogen sulphide there is formed ammonium thiosulphate which can easily be converted by treatment with sulphur dioxide into polythionate according to the equation:

$$2(NH_4)_2S_2O_3 + 3SO_2 = (NH_4)_2S_3O_6 + (NH_4)_2S_4O_6$$

As is known, even when only moderately heated polythionates change into ammonium sulphate and sulphur, sulphur dioxide being split off. It is however not necessary to convert a thiosulphate solution completely into polythionates for the purpose of forming ammonium sulphate and sulphur. It is sufficient to convert only a part of the thiosulphate into polythionate, so that the following reaction which proceeds very quickly when heat is applied under pressure may take place.

$$2(NH_4)_2S_2O_3 + (NH_4)_2S_4O_6 = 3(NH_4)_2SO_4 + 5S$$

The method of washing hydrogen sulphide from gases by means of ammonium sulphite solutions has hitherto been relatively little employed. This is due to the fact that the above reaction in the absorption of hydrogen sulphide sometimes proceeds very slowly. In another connection it has been found that the reaction between ammonium bisulphite and hydrogen sulphide proceeds in two stages, four molecules bisulphite first reacting with one molecule hydrogen sulphide according to the equation:

$$4NH_4HSO_3 + H_2S = (NH_4)_2S_2O_3 + (NH_4)_2S_3O_6$$

The polythionate formed by this first reaction then combines further with hydrogen sulphide according to the equation:

$$(NH_4)_2S_3O_6 + 3H_2S = (NH_4)_2S_2O_3 + 3H_2O + 4S$$

with formation of thiosulphate.

Now the first of these two reactions proceeds extraordinarily rapidly, whereas the second takes place very slowly at normal pressure. The first reaction thus permits very small quantities of hydrogen sulphide to be washed from a gas practically quantitatively. Attention must also be drawn to the fact that in the rapid first reaction a mixture of polythionate and thiosulphate is formed, which as stated above can easily be converted into ammonium sulphate and sulphur, without a further treatment of the used washing fluid with sulphur dioxide being necessary.

Now if the above mentioned method of removing hydrogen sulphide from gases by means of alkali thioarsenate compounds is combined with the described method of removing hydrogen sulphide from gases by means of ammonium bisulphite, the advantage arises, apart from the simple production of valuable ammonium sulphate, that it is only necessary to wash out a part of the hydrogen sulphide by means of the thioarsenate compounds, for which purpose relatively small quantities of the thioarsenate containing washing liquid and a relatively small and cheap washing apparatus are required, whilst the residue of hydrogen sulphide in the gas can be washed therefrom, utilizing the first absorption reaction, by means of the extremely reactive ammonium bisulphite solutions, this stage being likewise carried out in a very small apparatus. In the latter case further simplification of the apparatus is attained by the fact that the apparatus for treating with sulphur dioxide the used washing liquid which consists essentially of thiosulphate, for the purpose of forming polythionates, can be dispensed with.

A further object of my invention is to provide an improved method of removing hydrogen sulphide from gases with recovery of ammonium sulphate and sulphur, wherein the main part of the hydrogen sulphide is removed from the gas by means of a washing fluid containing ammonium thioarsenate compounds.

In the process for removing hydrogen sulphide from gases with recovery of elementary sulphur which is known as the Thylox process it is possible to use compounds of ammonia instead of sodium thioarsenate compounds. The removal of hydrogen sulphide with such ammonium thioarsenate compounds is however not always as complete as with the corresponding sodium compounds, and furthermore, the process has the defect that ammonia escapes into the gas and exhaust air formed by the oxidation of the used washing fluid. Both defects are overcome according to my invention.

In removing hydrogen sulphide from gases by means of ammonium thioarsenate compounds according to my present invention, I only remove the larger part of the hydrogen sulphide from the gas by means of the ammonium thioarsenate compounds, whilst the remainder of the hydrogen sulphide is washed out quantitatively by means of ammonium sulphite-bisulphite solutions, which I also employ to free from ammonia the ammonia containing exhaust air formed by the regeneration of the used washing liquid which is composed of ammonium thioarsenate compounds.

In this way all loss of ammonia is avoided. The advantage of this improvement lies in the fact that it is no longer necessary to add relatively expensive soda for the purpose of forming the thioarsenate washing fluid. The ammonium sulphur compounds formed incidentally in the ammonium thioarsenate washing fluid can also be regained or may be used for the production of ammonium sulphate, by being worked together with the thiosulphate and polythionate which are formed from the ammonium sulphite-bisulphite solution.

With the above and other objects of my invention in view I will now described the nature of the invention with reference to the accompanying drawing which illustrates diagrammatically an apparatus suitable for carrying out the process according to the invention.

The gas to be purified, for instance a coal distillation gas, is cooled to about 35° C. in a cooler not shown in the drawing where it precipitates ammonia water, and enters through the pipe 1 into a washer 2 provided with ordinary wooden hurdles 2a. Inside the washer 2 the gas is brought into contact with a solution of sodium sulphur arsenic compounds which are obtained by treating arsenic with soda and hydrogen sulphide. As is known, such a solution takes up sulphur water from the gas, forming higher thioarsenates according to the equation given at the beginning of this specification. The used washing fluid then flows out at the bottom of the washer 2 through the pipe 3 into a so-called thionizer 4 in which it is treated with air. The air is injected into the lower end of the thionizer, which is preferably in the form of a hollow cylindrical tower, by means of an air pump 4a. The height of the thionizer is such that the gas pressure in the lower part of the thionizer is sufficient to convert the thioarsenate into a thioarsenate of a smaller sulphur content by the splitting off of elementary sulphur and addition of oxygen. The sulphur formed in this process has the form of a froth or scum and separates out on the surface of the liquid as in a flotation process. The clear liquid is withdrawn at the top of the thionizer 4, through the pipe 4b and passed by the pump 5 to the upper end of the washer 2, where it is again used for removing hydrogen sulphide from the gas which is to be purified. The sulphur produced in the thionizer passes through the pipe 7 to an ordinary suction drum filter 8 by means of which it is separated as completely as possible from the mother lye. The mother lye flows through the pipe 8a into a separating vessel 8b which is connected by a pipe 8c with a pump 8d serving to produce a vacuum. In the apparatus 8b the mother lye is separated from any particles of sulphur which may still accompany it and which are returned to the filter 8 through the pipe 8e, whilst the clarified mother lye flows through the pipe 8f to a pump 8h by means of which it is returned through the pipe 8i to the thionizer.

The sulphur precipitated on the filter 8 first passes into a drying shaft 12 in which it is brought into contact with warm dry air in a well known manner, and then passes into an ordinary sulphur burning oven 15 to which combustion air is supplied through the pipe 16. The gas formed in the sulphur oven 15, which consists mainly of sulphur dioxide together with some sulphur trioxide and a certain quantity of inert gases, flows through the pipe 17 into an apparatus 18 in which the gas is treated with concentrated sulphuric acid, which takes up from the gas most of the sulphur trioxide. The gas passes from the apparatus 18 through the pipes 19 and 20 into a washing tower 21 provided with the ordinary wooden hurdles, and thence through the pipe 24 into a washing tower 25 likewise provided with wooden hurdles, from which finally the non-absorbed parts of the gas escape into the open through the pipe 27.

In the two washing towers 21 and 25 the gas from the sulphur burning oven 15 is brought into contact with the ammonia water which is previously precipitated from the gas by cooling. It is advantageous to treat the ammonia water with lime and convert it by distillation treatment into concentrated ammonia water. The ammonia water is supplied through the pipes 22 and 22a to the upper end of the towers 21 and 25, the supply being so regulated that a solution of ammonium sulphite and ammonium bisulphite having a sulphur dioxide tension is formed in the tower 21, whilst in the tower 25 a known ammonium sulphite-bisulphite solution is formed which has neither an ammonia nor a sulphur dioxide tension, so that the exhaust air from the tower 25 contains neither ammonia nor sulphur dioxide.

The ammonium sulphite-bisulphite solution formed in the washer 21 is pumped by the pump 23a through the pipe 23 to a washing tower 28 which is connected with the washing tower 2 by a pipe 29 in such a manner that the gas to be purified which is passed through the tower 2 passes from there into the lower end of the tower 28 which is also provided with the usual wooden hurdles or other suitable filling material. Inside the tower 28 the gas which still contains some hydrogen sulphide comes into contact with the ammonium sulphite-bisulphite solution, whereby the entire content of hydrogen sulphide is removed from the gas. Preferably the quantity of sulphite-bisulphite solution coming into contact with the gas inside the washer 28 is so regulated that roughly speaking each molecule hydrogen sulphide comes into contact with at least four molecules ammonium bisulphite. Thus a quantitative washing of the hydrogen sulphide from the gas to be purified is obtained.

The coal distillation gas which is now completely freed of hydrogen sulphide next passes from the washer 28 through the pipe 30 into the washer 31 in which it is brought into contact with the tension free solution of ammonium sulphite and ammonium bisulphite which is discharged at the base of the washer 25. For this purpose the washer 25 is connected with the washer 31 by the pipe 32. By the tension free sulphite-bisulphite solution the sulphur dioxide taken up by the gas in the tower 28 is quantitatively removed from the gas, so that the gas escapes through the pipe 31a completely freed of hydrogen sulphide, sulphur dioxide and ammonia.

The liquid discharged at the base of the washer 31 is transferred through the pipe 43 into the washer 21 for the purpose of conversion into a sulphurous acid ammonium sulphite-bisulphite solution, whilst the solution escaping from the washer 28 passes into a washing tower 34 through the pipe 34a. Inside the washing tower 34 the washing liquid is if necessary, that is, if it contains too much thiosulphate, treated with sulphur dioxide for the purpose of forming a larger quantity of polythionate. The sulphur dioxide passes into the washing tower 34 through the pipe 36 which is controlled by a valve 36a and is connected with the pipe 19.

If the used washing liquid from the washing tower 28 still contains disadvantageously large quantities of ammonium sulphite, further sulphur may be supplied to the liquid in the washer 34 through the pipe 34b. The sulphur reacts with the ammonium sulphite according to the equation

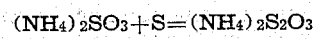

$$(NH_4)_2SO_3 + S = (NH_4)_2S_2O_3$$

The solution coming from the washer 34 which now consists of a mixture of ammonium polythionates and ammonium thiosulphate, together in given cases with some ammonium sulphites, is passed through the pipe 37 to an autoclave 38 which is provided with an apparatus consisting preferably of acid-resisting chrome nickel steel tubes suitable for indirectly heating the contents of the autoclave. In the autoclave 38 the solution is heated to temperatures preferably above 140° and under pressure, whereby all the ammonium compounds are converted into ammonium sulphate with simultaneous formation of elementary sulphur.

Upon conclusion of the reaction the sulphur collects in the lower part of the autoclave in the form of a deposit, from whence it can be withdrawn through the pipe 38a into sulphur solidifying pans 39. As soon as the sulphur has been withdrawn from the autoclave the three way cock 39a is reversed, and the ammonium sulphate solution then flowing from the autoclave is transferred through the pipe 40 into an evaporator 41, where it is confined until solid ammonium sulphate separates out.

The solid ammonium sulphate is finally separated from the adhering mother lye in an ordinary centrifugal 42.

If the apparatus shown in the drawing is intended to be used for removing hydrogen sulphide from gases by means of ammonium thioarsenate compounds, the upper end of the thionizer 4 is, as indicated in dotted lines in the drawing, connected with the washing tower 34 by the pipe 4c for the purpose of leading off the ammonia containing exhaust air escaping from the said thionizer. This exhaust air then comes into contact in the tower 34 with the spent solution of the initially sulphite-bisulphite solution having a sulphur dioxide tension which quantitatively removes all the ammonia from the exhaust air.

It is also preferable in this case continuously or intermittently to remove a portion of the completely used ammonium thioarsenate solution from the thionizer 4 or the tower 2, and after separating the arsenic compounds pass it to the autoclave 38 or the evaporator 41 for the purpose of obtaining the ammonium compound contained in the used solution.

I do not desire my present invention to be restricted to the special embodiment herein described, on the contrary the invention may be variously embodied within the scope of the claims hereinafter made.

I claim:—

1. The process for removing hydrogen sulphide from coal distillation gases or the like with recovery of useful substances, comprising treating the gas to be purified in one stage with a solution of alkali sulphur arsenic compounds capable of absorbing hydrogen sulphide and thereby removing such quantity of hydrogen sulphide from the gas as to leave therein substantially just that quantity of hydrogen sulphide required for subsequent substantially complete hydrogen sulphide purification by the reaction between four molecules ammonium bisulphite with each molecule of hydrogen sulphide with the production of a residual liquor that is primarily polythionate, regenerating the used washing liquid by treating with oxidizing gases and recovering sulphur therefrom, burning the sulphur, combining the sulphur dioxide thus formed with ammonia from the gas to form a solution of ammonium sulphite and ammonium bisulphite, and treating the gas to be purified in another stage with the said ammonium sulphite ammonium bisulphite solution so as to remove the residual hydrogen sulphide with discharge of the solution as a principally polythionate liquor.

2. The process for removing hydrogen sulphide from coal distillation gases or the like with recovery of useful substances, comprising treating the gas to be purified in one stage with a solution of alkali sulphur arsenic compounds capable of absorbing hydrogen sulphide and thereby removing such quantity of hydrogen sulphide from the gas as to leave therein substantially just that quantity of hydrogen sulphide required for subsequent substantially complete hydrogen sulphide purification by the reaction between four molecules ammonium bisulphite with each molecule of hydrogen sulphide with the production of a residual liquor that is primarily polythionate, and treating the gas in another stage with such a quantity of ammonium bisulphite containing solution prepared from ammonia of the gas and sulphur from hydrogen sulphide removed from the gas that approximately four molecules ammonium bisulphite come into contact with each molecule hydrogen sulphide still contained in the gas to be purified and that the spent liquor is discharged as a principally polythionate liquor.

3. The process for removing hydrogen sulphide from coal distillation gases or the like with recovery of useful substances, comprising treating the gas to be purified in one stage with a solution of alkali sulphur arsenic compounds capable of absorbing hydrogen sulphide and thereby removing such quantity of hydrogen sulphide from the gas as to leave therein substantially just that quantity of hydrogen sulphide required for subsequent substantially complete hydrogen sulphide purification by the reaction between four molecules ammonium bisulphite with each molecule of hydrogen sulphide with the production of a residual liquor that is primarily polythionate, regenerating the used washing liquid by treating with oxidizing gases and recovering sulphur from the regeneration step, burning the sulphur, combining the sulphur dioxide formed thereby with ammonia from the gas and forming thereby a solution of ammonium sulphite and ammonium bisulphite, and treating the gas in another stage with such a quantity of the so formed ammonia bisulphite containing solution that there are approximately four molecules alkali bisulphite to each molecule hydrogen sulphide still remaining in the gas to be purified.

4. The process for removing hydrogen sulphide from coal distillation gases or the like with recovery of useful substances, comprising treating the gas to be purified in one stage with a solution of alkali sulphur arsenic compounds capable of absorbing hydrogen sulphide and thereby removing the excess of hydrogen sulphide therein over that required for subsequently removing by a reaction requiring four molecules of ammonium sulphite for each molecule of hydrogen sulphide, treating the gas in a second stage with a solution of ammonium sulphite and ammonium bisulphite having a sulphur dioxide tension, in accordance with said reaction and so as to discharge the liquor from said treatment as a principally polythionate liquor.

5. The process for removing hydrogen sulphide from coal distillation gases or the like with recovery of useful substances, comprising treating the gas to be purified in one stage with a solution of alkali sulphur arsenic compounds capable of absorbing hydrogen sulphide, regenerating the used washing liquid by treating same with oxidizing gases and recovering sulphur therefrom, burning the sulphur, combining the sulphur dioxide formed thereby with an ammonium solution to form a solution of ammonium sulphite and ammonium bisulphite having a sulphur dioxide tension, and further to form an ammonium bisulphite ammonium sulphite solution having neither an ammonia nor a sulphur dioxide tension, treating the gas to be purified in another stage with the ammonium sulphite-ammonium bisulphite solution having a sulphur dioxide tension, and treating the gas in a final stage with a tension free solution of ammonium sulphite and ammonium bisulphite.

6. The process according to claim 5 wherein the gas to be purified is brought into contact with such a quantity of the alkali sulphite-alkali bisulphite solution having a sulphur dioxide tension in the ratio of approximately four molecules alkali bisulphite to each molecule hydrogen sulphide still contained in the gas.

7. The process according to claim 1 wherein the discharged washing liquid is heated under pressure to temperatures above 140° C.

8. The process according to claim 1 wherein ammonia is first separated from the gas to be purified, the ammonium sulphite ammonium bisulphite solution required for washing the gas being formed from the separated ammonia.

9. The process according to claim 1 wherein the ammonia separated from the gas to be purified is converted into concentrated ammonia water which then serves for forming the ammonium sulphite-ammonium bisulphite solution required for washing the gas.

10. The process as set forth in claim 1 wherein ammonium sulphur arsenic compounds are used for removing hydrogen sulphide from the gas to be purified in the aforesaid one stage.

11. The process according to claim 1 wherein ammonium sulphur arsenic compounds are used for removing hydrogen sulphide from the gas in the aforesaid one stage and wherein the ammonia containing exhaust oxidizing gas formed in regenerating the used washing liquid which contains ammonium sulphur arsenic compounds is brought into contact with the spent polythionate solution from the later washing stage.

12. The process according to claim 1 wherein the liquor discharged as polythionate is treated with sulphur dioxide and then is heated under pressure to convert the discharged liquor to ammonium sulphate and sulphur.

CONSTANZ EYMANN.